Figure 1:
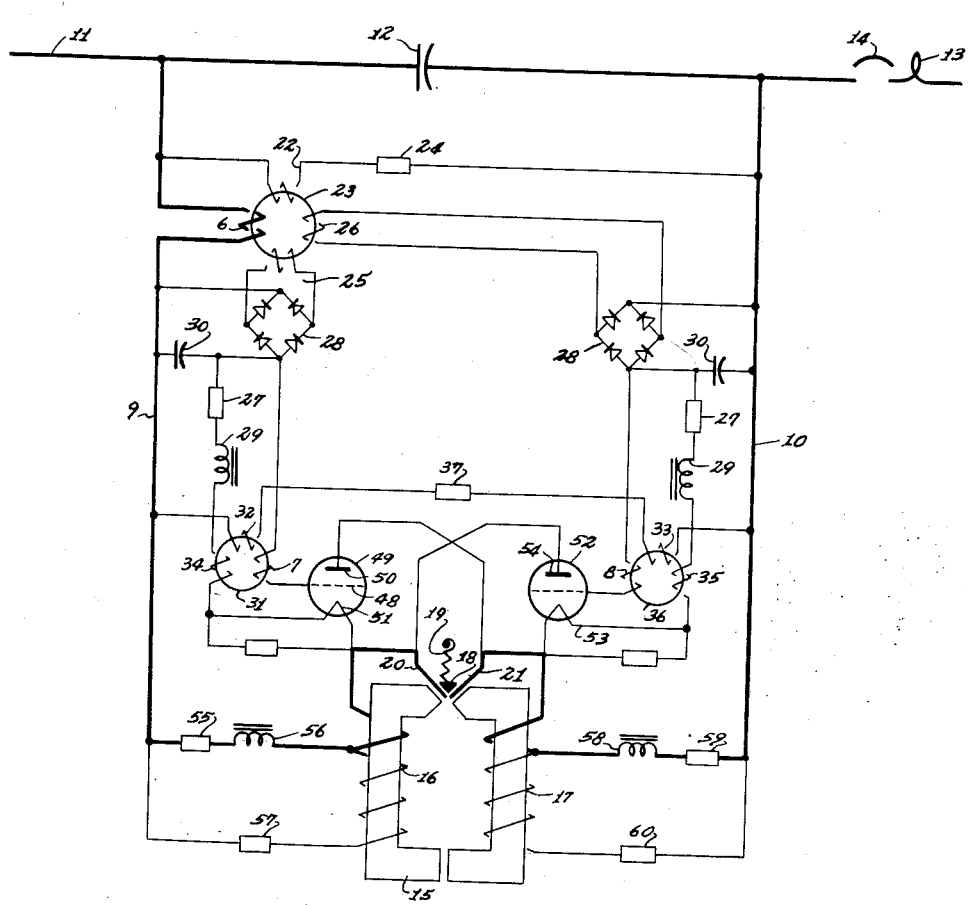

Dec. 29, 1953    E. J. DIEBOLD    2,664,526
SERIES CAPACITOR PROTECTOR
Filed Oct. 26, 1950

INVENTOR.
EDWARD JOHN DIEBOLD
BY
Ostrolenk & Faber
ATTORNEYS

Patented Dec. 29, 1953

2,664,526

UNITED STATES PATENT OFFICE 2,664,526

SERIES CAPACITOR PROTECTOR

Edward John Diebold, Ardmore, Pa., assignor to I-T-E Circuit Breaker Company, Philadelphia, Pa., a corporation of Pennsylvania Application October 26, 1950, Serial No. 192,190

1 Claim. (Cl. 317—12)

My present invention, which is a continuation-in-part of the invention disclosed in application Serial No. 144,571 filed February 16, 1950, relates to a series capacitor protective system, and more particularly relates to a novel by-pass circuit around the series capacitor which is arranged to close when the circuit in the main line approaches fault current values and which by-pass circuit is opened at the end of the cycle.

As described in the above-identified application, series capacitors connected in power lines for power factor correction are subjected to the danger of failure of the dielectric of the capacitor due to the voltage $$\left(e = \frac{i}{\omega c}\right)$$

where (e) is the voltage appearing across the capacitor (c) when a fault current condition (i) occurs on the line.

A capacitor is usually designed to carry a predetermined excess above a normal full load current to allow for a reasonable factor of safety. However, the required volume of the dielectric of the capacitor varies as the square of the current, and accordingly the allowable factor of safety is limited well below the values of possible fault currents that may flow in the system if the capacitor is not to be made too bulky and costly.

Accordingly, it has been the practice to introduce a by-pass circuit around the capacitor which is normally open. This by-pass circuit is closed only when the current in the power line reaches such fault current values that the voltage developed across the capacitor would rupture the dielectric if permitted to flow through the capacitor.

In accordance with my invention, I have provided a switching circuit controlled by a relay which in cooperation with a valve, such as a caesium vapor tube, can achieve a quick or substantially instantaneous closing of the by-pass circuit when the current reaches fault current values and which opens with substantially no arcing at the end of a cycle to immediately restore the system to its normal condition.

Accordingly, an object of my invention is to provide a novel switching circuit which by-passes the series capacitor of a power line.

A further object of my invention is to provide a relay having an armature of minimum mass which directly controls a switching circuit by-passing a series capacitor.

Still another object of my invention is to provide a by-pass circuit comprising a relay control switch and valve means for measuring currents to determine the closing of the by-pass switch and for opening the by-pass switch instantly at the end of each cycle.

These and other objects will appear from the detailed description which is to follow in connection with the drawing which shows a circuit diagram of one form of my invention.

Referring now to the drawing, a power line 11 has connected in series therewith a series capacitor 12 and a circuit breaker 14 controlled by an overload relay 13 in a manner well known in the art.

A circuit arrangement for protecting the series capacitor 12 comprises a magnet 15 having windings 16 and 17, a substantially massless armature 18 fixed in an open position by spring 19 and movable to engage the conducting surfaces 20 and 21 when the windings 16 and 17 are energized in a manner to be described.

Connected in parallel with the capacitor 12 is a relatively high impedance primary 22 of a transformer 23 and having in circuit therewith a resistor 24. When the by-passing circuit does not operate, the small current through winding 22, limited by the resistor 24 energizes transformer 23. When the by-passing circuit operates, the high current through winding 6 energizes transformer 23. Winding 6 has few turns for high current, winding 22 has many turns for low current. Transformer 23 works as a potential transformer under normal conditions and as a current transformer under fault condition. The core of transformer 23 is made of permeron. The magnetic flux in the core is shifted once per cycle from full positive saturation to full negative saturation and back, no matter how low or how high the currents in windings 6 and 22 are; one of the peculiar properties of the magnetic material. Therefore, the average rectified voltages induced in windings 25 and 26 are constant, as described in my application Serial No. 144,571; thus maintaining a constant D. C. bias in windings 34 and 35, the same as a constant heater current in the cathodes 51 and 53 and a constant negative grid bias for windings 7 and 8.

The alternating current flowing through the winding 22 of transformer 23 energizes the secondary windings 25 and 26 of transformer 23. The output of winding 25 is connected through the rectifier network 28 and through the smoothing filter circuit including the inductance 29 and capacitor 30 for energizing the bias winding 34 of the transformer 31.

Figure 2:
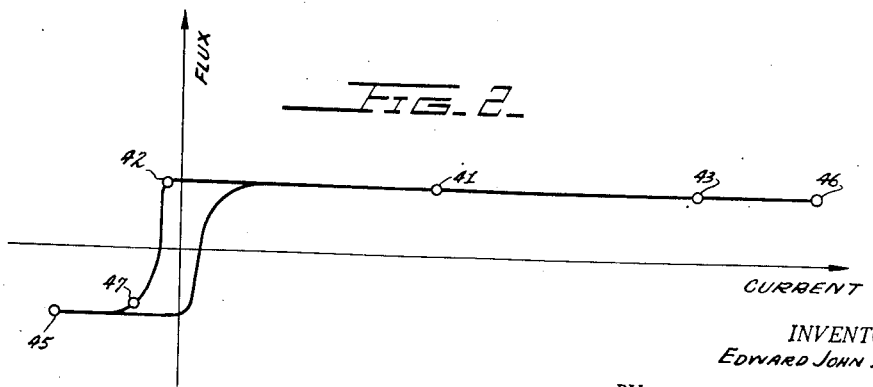

Similarly the secondary winding 26 is connected to a bridge rectifier and through the smoothing filter circuit to the bias winding 35 of the transformer 36. Transformers 23, 31 and 36 are provided with a permeron core which as described in the aforesaid application is described in Bulletin #4809 of the I-T-E Circuit Breaker Co. entitled "Mechanical Rectifiers" and which has a hysteresis loop characteristic such as shown in Figure 2 in which at low current values the flux change is steep. The core becomes saturated at relatively low current values and thereafter further changes in current results in no further change in flux, all of which will be described more fully hereinafter.

As described in the aforesaid application, the current output of the windings 25 and 26 energizes the bias windings 34 and 35 and bias the flux in the core on transformers 31 and 36, respectively, to the point 41, Figure 2.

Also connected in parallel with the capacitor 12 is the circuit extending through the windings 32 and 33 and the resistor 37.

The bias currents through windings 34 and 35 are in opposite direction with reference to the primary current in windings 32 and 33.

The current, therefore, flowing over the circuit from conductors 9 to 10 through the primary windings 32 and 33 is determined by the voltage across capacitor 12 and the resistance of resistor 37. As the load current in line 11 changes from no to full load, the voltage across capacitor 12 changes correspondingly and the current flowing through windings 32 and 33 changes over a maximum range from a cyclic swing to just either side of 41 (Figure 2) to a maximum swing from 42 to 43. Accordingly, such current variations as occur in the main line 11 from no load through full load because it does not extend beyond 42 (Figure 2) result in no change in the flux of the transformers 31 and 36 and therefore normally no voltage will be induced in the secondary windings 7 and 8 as pointed out above.

At the instant, however, that the current in the main line reaches dangerous fault current values, the current oscillations in the primary windings 32 and 33 will extend beyond points 42 to, for example, 45 and 46. In this range, the flux variation in the core beginning at the current value 42 changes rapidly to the point 47 and as a result of this steep curved change in flux, a voltage pulse of very short duration (.00001 second) is induced in the secondary windings 7 or 8 depending on the polarity of the wave at the instant.

This voltage will be induced in the secondary winding 7 of transformer 31 or 8 of transformer 36 depending upon the polarity in which half cycle fault current occurred.

Assuming for the moment that the overload occurred during the half cycle during which the current in winding 32 is opposed to the bias current in 34, the transformer 31 will in that case, desaturate and therefore produce a pulse in the winding 7 which is applied to the grid 48 of the gas tube 49.

Tube 49 is a gas filled triode tube, preferably a caesium vapor tube, which has the characteristic of conducting between its cathode 51 and anode 50 at a relatively very low voltage applied to the anode 50. Accordingly, substantially near the beginning of a cycle in which the current rise indicates fault current conditions, and indeed at the instant that the current value in that cycle has exceeded the value at which current through winding 32 has changed the flux from 42 toward 47 in Figure 2, the tube 49 is ignited.

Upon ignition of the tube 49, a circuit is completed from line 11 through the winding 16, over the cathode 51 in anode 50 of the tube 49 through the winding 17 to the other side of the line.

When the circuit for windings 16 and 17 is completed through the tube 49, the current is sufficient to energize the core 15 and the armature 18 is instantly pulled down to close contacts 20 and 21.

The armature 18 is, as schematically here illustrated, a minute substantially massless member ($\frac{1}{10}$ gram) so that upon energization of the magnet 15, which exerts a force of several pounds across an air gap of about $\frac{5}{1000}''$, the armature will move to engage contacts 20 and 21 substantially instantaneously (less than .0001 sec.). When armature 18 reaches contacts 20 and 21, the above traced circuit through the tube 49 is by-passed over contacts 20 and 21 and during the remaining portion of the cycle, the fault current over the line 11 will flow through the windings 16 and 17 and contacts 20 and 21 thus by-passing the capacitor 12 and preventing its damage until such time as the circuit breaker 14 in response to the energization of the overload relay 15 will open the circuit.

At the end of the cycle as the current through windings 16 and 17 reaches zero value, the relay 15 is momentarily de-energized. At that instant, due to the substantially massless character of armature 18 ($\frac{1}{10}$ gram); its biasing spring 19 will withdraw the armature (with a force of about 1 pound) from engaging and bridging contacts 20 and 21 and the circuit for the power line 11 is again completed through the capacitor 12.

If the fault condition has been cured, nothing further happens during the half cycle. If, however, during the second half of the cycle, the fault condition still obtains, then during that half of the cycle the current in winding 33 will overcome the bias current in winding 35 of transformer 36 in a manner described in connection with the winding 32 and transformer 31. The current through the winding 33 of transformer 36 will carry the flux from point 42 to point 47 producing as a result of this instantaneous change in flux a pulse in the winding 8 of the saturable transformer 36.

The pulse induced in 8 will in turn apply a voltage to the grid of the tube 52 in a manner similar to that described in connection with tube 49 and the tube will be ignited completing an energizing circuit for the current in the power line 11 from the cathode 53 to the anode 54 of tube 52.

This action will result in energization of the windings 16 and 17 as described above during the second half cycle causing the armature 18 to be attracted and bridge the contacts 20 and 21.

The magnetic flux in core 15 will not be in phase with the current in the windings 16 and 17, but lagging slightly, due to the iron losses. Therefore, the winding 16 is energized through a phase shifter consisting of the resistors 55 and 57 and the reactors 56. The same is valid for 17 with 58, 59 and 60. The operation of the phase shifters is described in Kesselring Patent No. 2,499,394.

While I have shown my invention in connection with caesium tubs, it will be apparent that any well known triode may also, if desired, be employed but preferably such a tube should have sufficient sensitivity so that although it will not become conductive during normal current flowing in the line 11, it does become conductive to permit energization of the relay 15 instantaneously when the current value in the main line approaches fault current values.

Similarly, the specific details of the saturable transformers and the means for producing a constant biasing pulse may be modified within the spirit of my invention.

I claim:

A protecting system for protecting a capacitor in an alternating current power system comprising a relay having windings and an armature therefor normally biased to disengaged position, a multielectrode electron tube having a control electrode, circuit connections from said power system to said windings with said electron tube connected in series therewith, a reactor having a first winding, circuit connections from said protecting system and said power circuit to said reactor first winding, said reactor having a second winding, a source of direct current, circuit connections from said direct current source to said second winding for applying direct current thereto for biasing said reactor to a saturation value at which said reactor is non-responsive to the normal current swings in said power circuit for different load current values, said first reactor winding being energized from said power circuit for energizing said reactor in response to a load swing in said power circuit of the value in excess to the normal load value of the circuit, said reactor having a secondary winding energized by said last mentioned response, circuit connections from said secondary winding to said control electrode for energizing said electron tube, said electron tube when energized completing an energizing circuit for said relay winding and circuit connections including said armature in its engaged position, to said power circuit on opposite sides of said capacitor and controlled by the armature of said relay when said relay winding is energized for providing a by-pass circuit around said capacitor.

EDWARD JOHN DIEBOLD.

References Cited in the file of this patent

UNITED STATES PATENTS

| Number | Name | Date |
|---|---|---|
| 1,905,226 | Hoard | Apr. 25, 1933 |
| 2,162,488 | Marbury | June 13, 1939 |
| 2,363,898 | Partington | Nov. 28, 1944 |
| 2,401,009 | Marburg | May 28, 1946 |